(12) United States Patent
Tang

(10) Patent No.: US 7,626,816 B2
(45) Date of Patent: Dec. 1, 2009

(54) HOUSING OF FOLDABLE ELECTRONIC DEVICE

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/147,498

(22) Filed: Jun. 27, 2008

(65) Prior Publication Data

US 2009/0168335 A1 Jul. 2, 2009

(30) Foreign Application Priority Data

Dec. 27, 2007 (CN) .......................... 200710203493

(51) Int. Cl.
- *H05K 5/00* (2006.01)
- *G06F 1/16* (2006.01)
- *E05C 5/00* (2006.01)
- *E05C 19/00* (2006.01)

(52) U.S. Cl. ............................ 361/679.58; 361/679.26; 361/679.27; 292/63; 292/66; 292/67; 292/302; 312/265.5; 312/263

(58) Field of Classification Search ................. 361/679.01–679.45, 679.55–679.58; 345/156, 345/157, 168, 169; 312/265.5, 263; 292/63, 292/66, 67, 302

See application file for complete search history.

(56) References Cited

U.S. PATENT DOCUMENTS

| | | | | | |
|---|---|---|---|---|---|
| 5,465,191 | A | * | 11/1995 | Nomura et al. | 361/679.27 |
| 5,497,296 | A | * | 3/1996 | Satou et al. | 361/679.09 |
| 6,108,196 | A | * | 8/2000 | Jung | 361/679.55 |
| 6,563,699 | B1 | * | 5/2003 | Choi | 361/679.09 |

\* cited by examiner

*Primary Examiner*—Jayprakash N Gandhi
*Assistant Examiner*—Nidhi Desai
(74) *Attorney, Agent, or Firm*—Zhigang Ma

(57) ABSTRACT

An exemplary housing of a foldable electronic device includes a first cover, a second cover, a latching member, a contact member, and a resilient member. The first cover includes a lock receiving portion. The second cover includes a fixing portion. The latching member includes a pivot hole, a first transmission portion, and a lock portion configured for engaging with the lock receiving portion. The pivot hole engages with the fixing portion such that the latching member is rotatable relative to the fixing portion. The contact member includes a second transmission portion. The second transmission portion engages with the first transmission portion and is able to drive the latching member to rotate. The resilient member drives the latching member to rotate to its original position.

13 Claims, 10 Drawing Sheets

HOUSING OF FOLDABLE ELECTRONIC DEVICE

BACKGROUND OF THE INVENTION

1. Field of the Invention

The present invention generally relates to housings of foldable electronic devices, and particularly, to a housing typically used for a notebook.

2. Discussion of the Related Art

Referring to FIGS. 9 and 10, a typical housing 10 of a foldable electronic device is shown. The housing 10 includes a main body 11, a top cover 12, a sliding member 13, a hook 14, and a spring 15. A latching groove 111 is defined in the main body 11 and the latching groove 111 is adjacent to a side of the main body 11. A rectangular mounting groove 121 is defined in a side of the top cover 12 and the top cover 12 forms a resisting member 123 that is adjacent to the mounting groove 121. The sliding member 13 is disposed in the mounting groove 121 and is able to slide, left or right, along the groove. The hook 14 is configured to be latched in the latching groove 111. The hook 14 includes an end that is fixed to the sliding member 13 so that the hook 14 is movable together with the sliding member 13. One end of the spring 15 abuts the resisting member 123 and the other end of the spring 15 abuts the hook 14 so that the hook 14 and the sliding member 13 are normally forced to remain on the left side of the mounting groove 121.

To open the top cover 12, a user has to slide the sliding member 13 towards the right side of the mounting groove 121. However, the sliding member 13 is generally designed to be inconspicuous, thereby having a small outer surface area and the outer surface of the sliding member 13 may line up with the surface of the edge (side) of the cover. Thus when sliding the sliding member 13 with a finger, to open the top cover 12, the finger may slip. As a result, opening the top cover 12 is bothersome.

Therefore, a new housing of a foldable electronic device is desired in order to overcome the above-described shortcomings.

SUMMARY

A housing of a foldable electronic device includes a first cover, a second cover, a latching member, a contact member, and a resilient member. The first cover includes a lock receiving portion. The second cover includes a fixing portion and a first sliding portion. The latching member includes a pivot hole, a first transmission portion, and a lock portion configured for engaging with the lock receiving portion. The pivot hole engages with the fixing portion such that the latching member is rotatable relative to the fixing portion. The contact member includes a contact portion, a second sliding portion, and a second transmission portion. The contact portion is partially exposed out of the second cover. The second sliding portion is configured for engaging with the first sliding portion. The second transmission portion is configured for engaging with the first transmission portion and is able to drive the latching member to rotate. The resilient member drives the latching member to rotate to its original position when the latching member is driven by the second transmission portion to rotate predetermined degrees.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present housing of the foldable electronic device. Moreover, in the drawings, like reference numerals designate corresponding parts throughout several views, and all the views are schematic.

DETAILED DESCRIPTION OF THE PREFERRED EMBODIMENT

Reference will now be made to the drawings to describe a preferred embodiment of the present housing of the foldable electronic device in detail.

The present housing is used for foldable electronic devices, such as notebooks, cell phones, media players, and so on. In the preferred embodiment, a housing of a notebook is taken as exemplary to describe the housing of the present invention.

Figure 1:
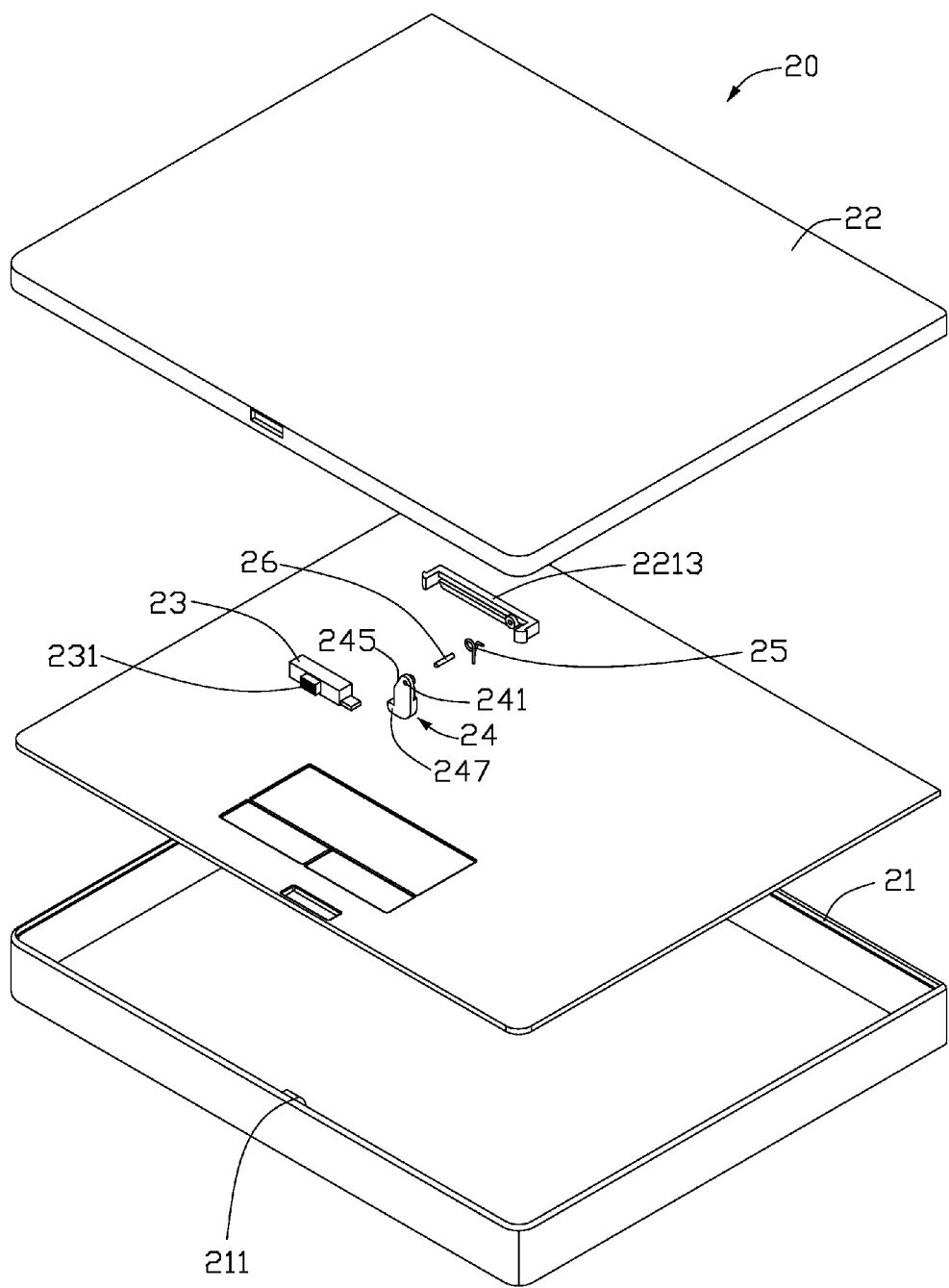
FIG. 1 is an exploded, isometric view of a housing of a foldable electronic device in accordance with a preferred embodiment of the present invention.
Figure 2:
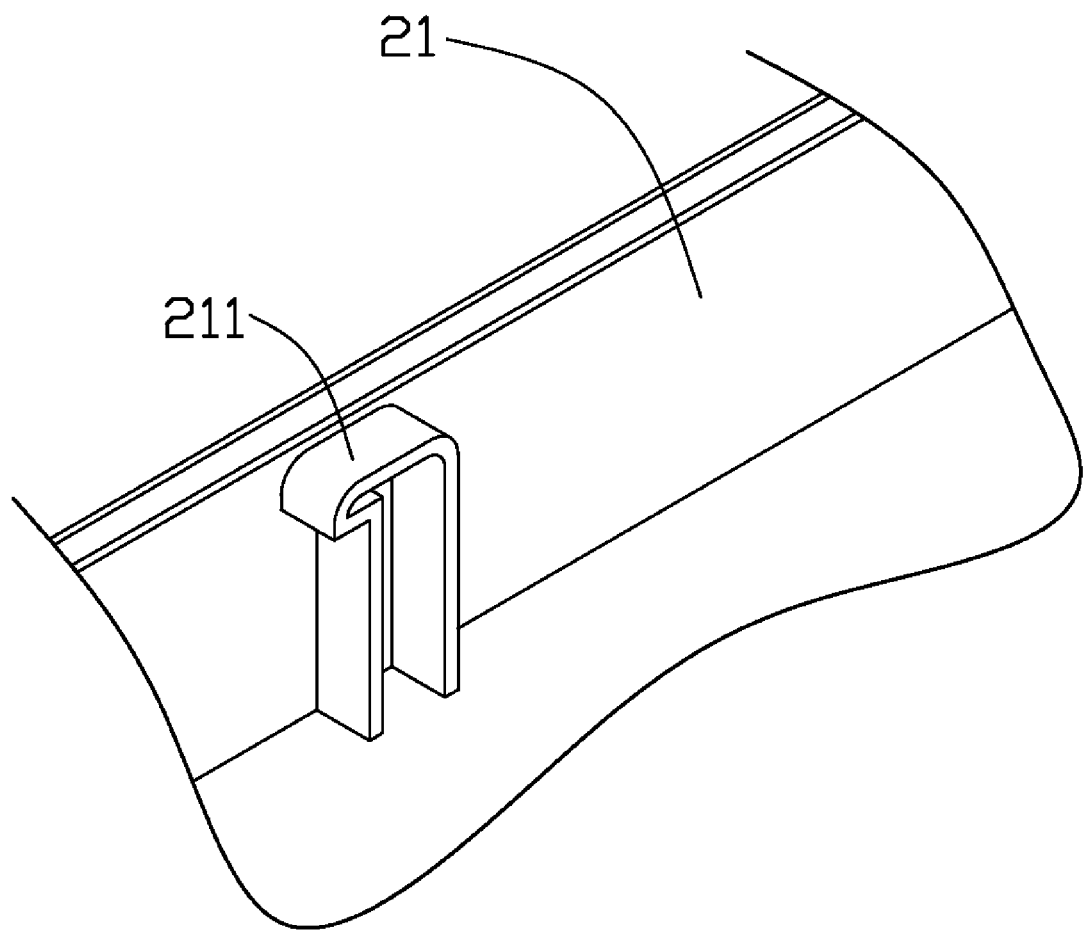
FIG. 2 is enlarged an isometric view of a main body of the housing in FIG. 1.

Referring to FIGS. 1 and 2, a housing 20 of an exemplary embodiment for a notebook is shown. The housing 20 includes a main body 21, a top cover 22, a contact member 23, a latching member 24, and a resilient member 25. The main body 21 includes a lock receiving portion 211. The resilient member 25 is a torsion spring.

Figure 3:
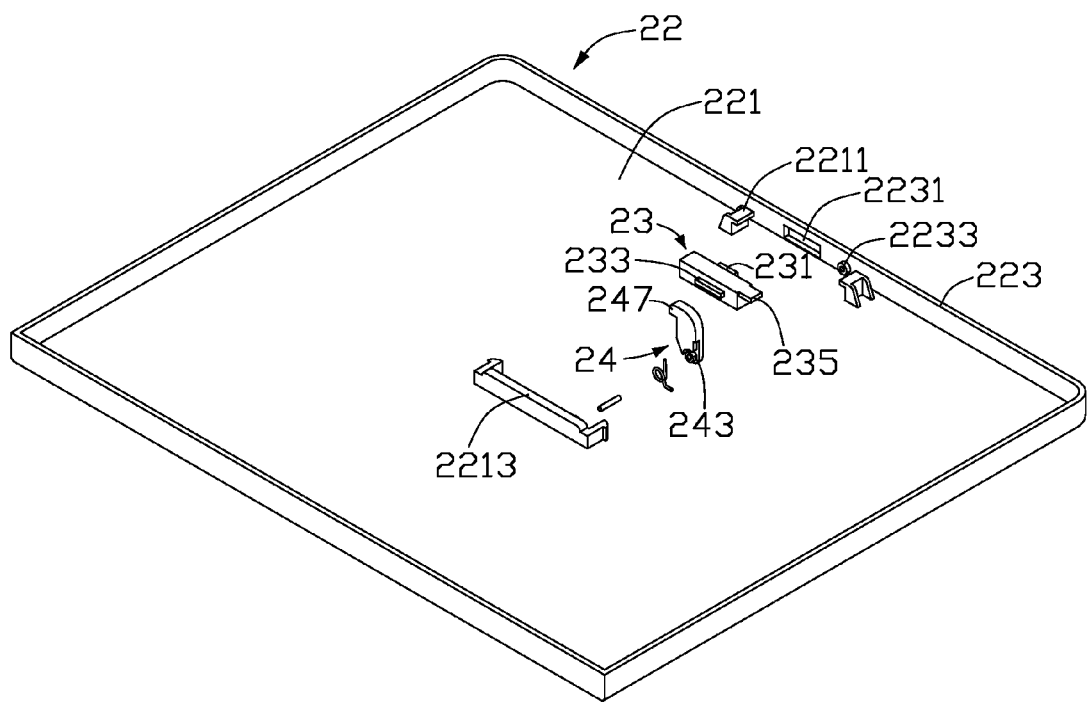
FIG. 3 is a view of a portion of FIG. 1.
Figure 4:
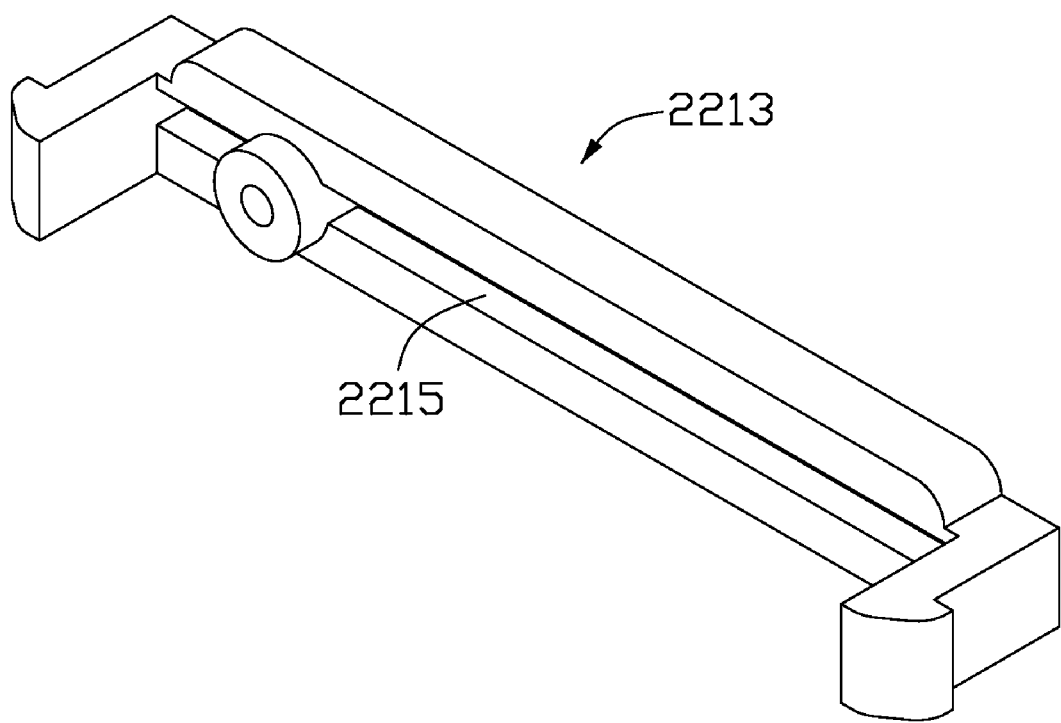
FIG. 4 is an isometric view of a rib block of the housing in FIG. 1.

Also referring to FIGS. 3 and 4, the top cover 22 includes a base 221 and a plurality of sidewalls 223. The sidewalls 223 extend from the base 221. A through hole 2231 is defined in one of the sidewalls 223 (hereinafter referred to as front sidewall 223a) and the front sidewall 223a forms a fixing portion 2233. The through hole 2231 is rectangular in shape. The fixing portion 2233 is adjacent to the through hole 2231. The base 21 forms two fixing blocks 2211 adjacent to the through hole 2231. The two fixing blocks 2211 are located on opposite sides of the through hole 2231 correspondingly. In addition, the base 221 further includes a rib block 2213 formed on the base 221 and the rib block 2213 faces the through hole 2231. The rib block 2213 forms a sliding portion 2215 in a side surface of the rib block 2213 facing the through hole 2231. In the illustrated embodiment, the fixing portion 2233 is a cylindrical groove, and the sliding portion 2215 is an elongated groove.

The latching member 24 is substantially elongated. One end of the latching member 24 defines a pivot hole 241 and the other end of the latching member 24 forms a lock portion 247; the lock portion 247 is configured for engaging with the lock receiving portion 211. The latching member 24 also forms a retaining portion 243 and a first transmission portion 245 adjacent to the pivot hole 241.

The contact member 23 is elongated. A contact portion 231 and a sliding portion 233 are formed on opposite sides of the contact member 23 correspondingly. The contact portion 231 is smaller than the through hole 2231 such that the contact portion 231 is able to be positioned in the through hole 2231 and partially exposed out of the top cover 22. The sliding portion 233 of the contact member 23 is an elongated protrusion configured for engaging with the sliding portion 2215 of the rib block 2213 such that the contact member 23 is slidable relative to the rib block 2213. In addition, one end of the contact member 231 forms a second transmission portion 235 configured for engaging with the first transmission portion 245. The second transmission portion 235 has a slanted surface.

Figure 5:
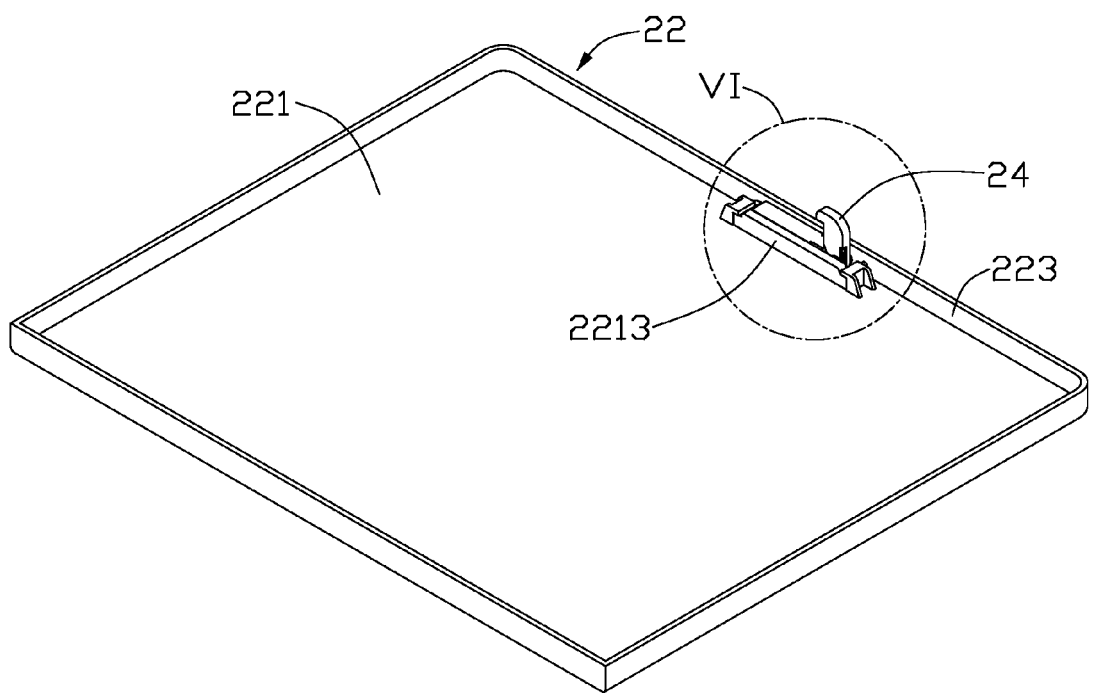
FIG. 5 is an assembled, isometric view of a portion of the housing in FIG. 1.
Figure 6:
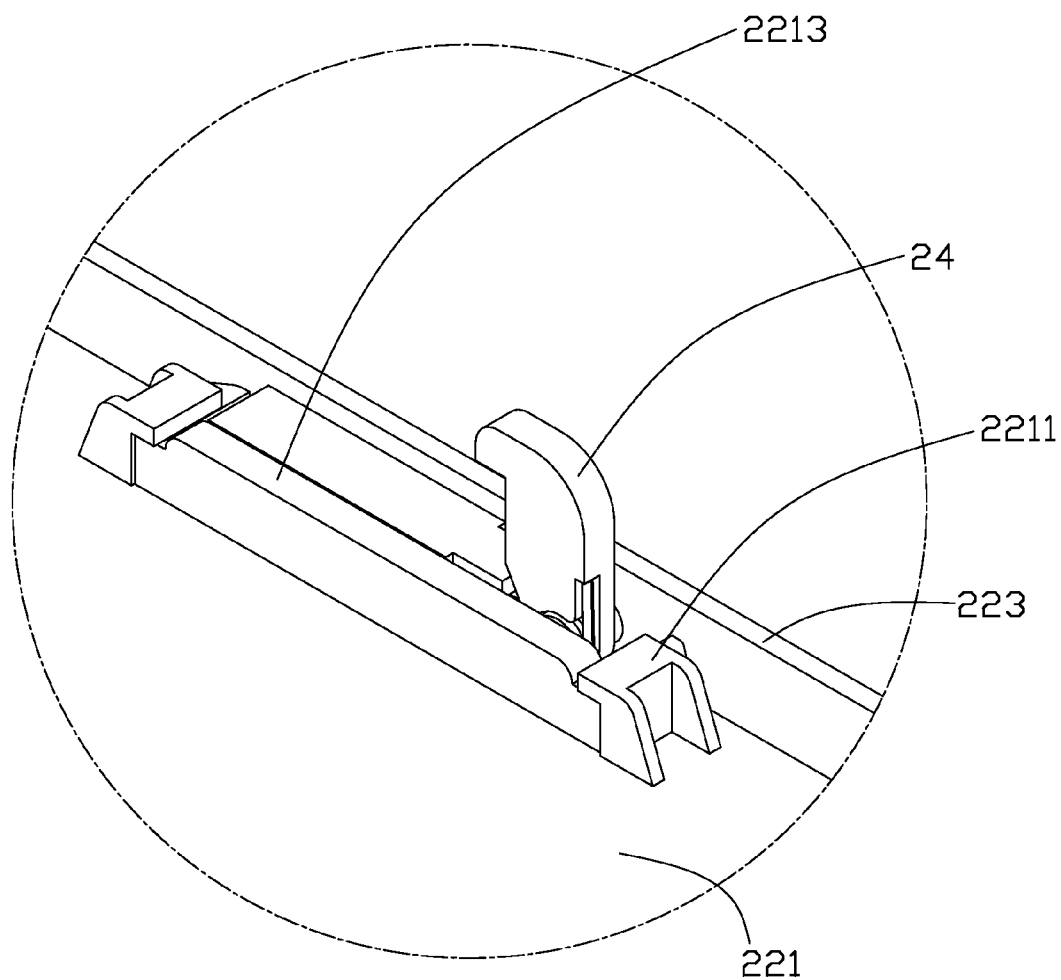
FIG. 6 is an enlarged view of the circled portion VI in FIG. 5.

Referring also to FIGS. 5 and 6, in an assembly process, the contact portion 231 is positioned in the through hole 2231. The pivot hole 241 is aligned with the fixing portion 2233, and one end of the pin 26 is passed through the pivot hole 241 and received in the fixing portion 2233 such that the latching member 24 is rotatably positioned on the top cover 22. The spring coils of the resilient member 25 are looped around the retaining portion 243 with one end of the resilient member 25 resisting the base 211. The rib block 2213 is moved towards the contact member 23 such that the sliding portion 233 of the contact member 23 is inserted into the sliding portion 2215 of the rib block 2213. In addition, two ends of the rib block 2213 are secured to the two fixing blocks 2211 correspondingly.

Figure 7:
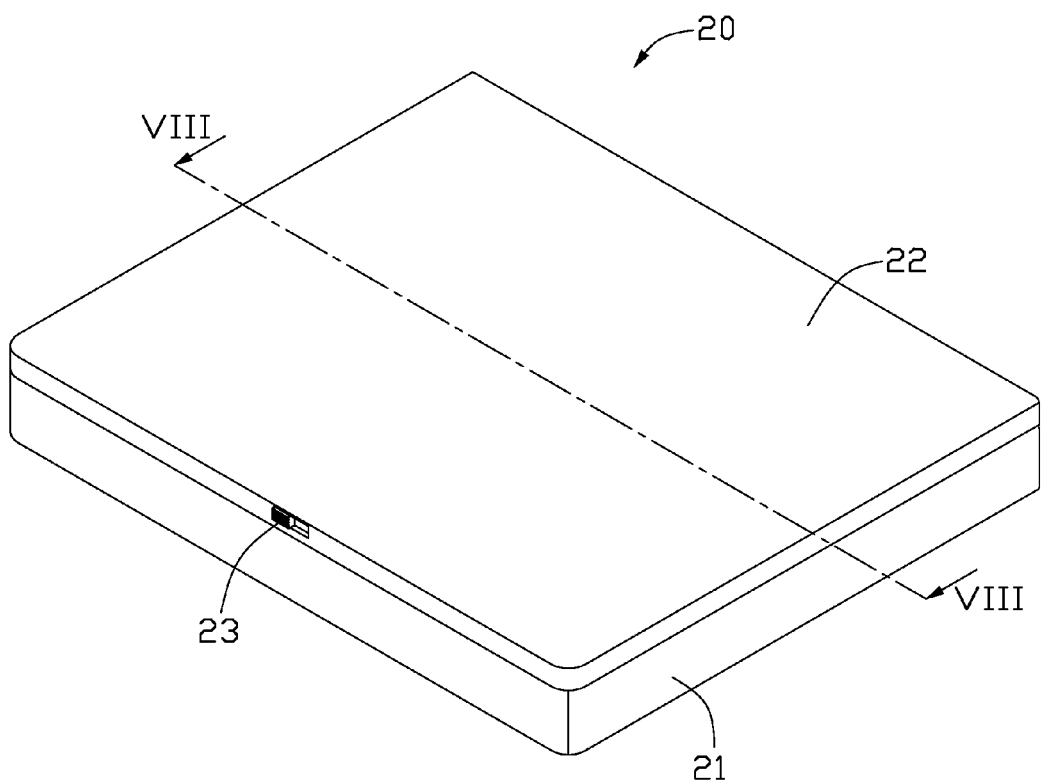
FIG. 7 is an assembled, isometric view of the housing in FIG. 1 when it folded.
Figure 8:
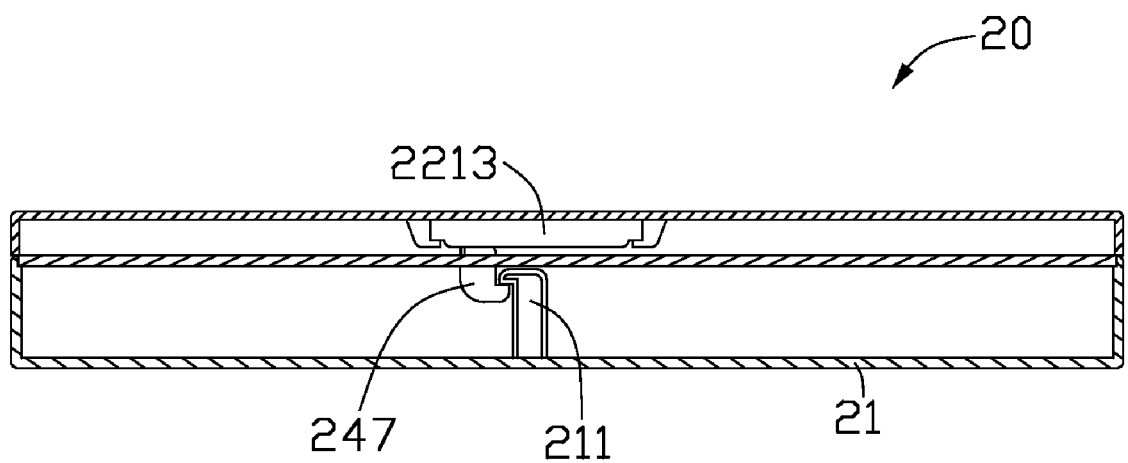
FIG. 8 is a cross-sectional view taken along the line VIII-VIII in FIG. 7.
Figure 9:
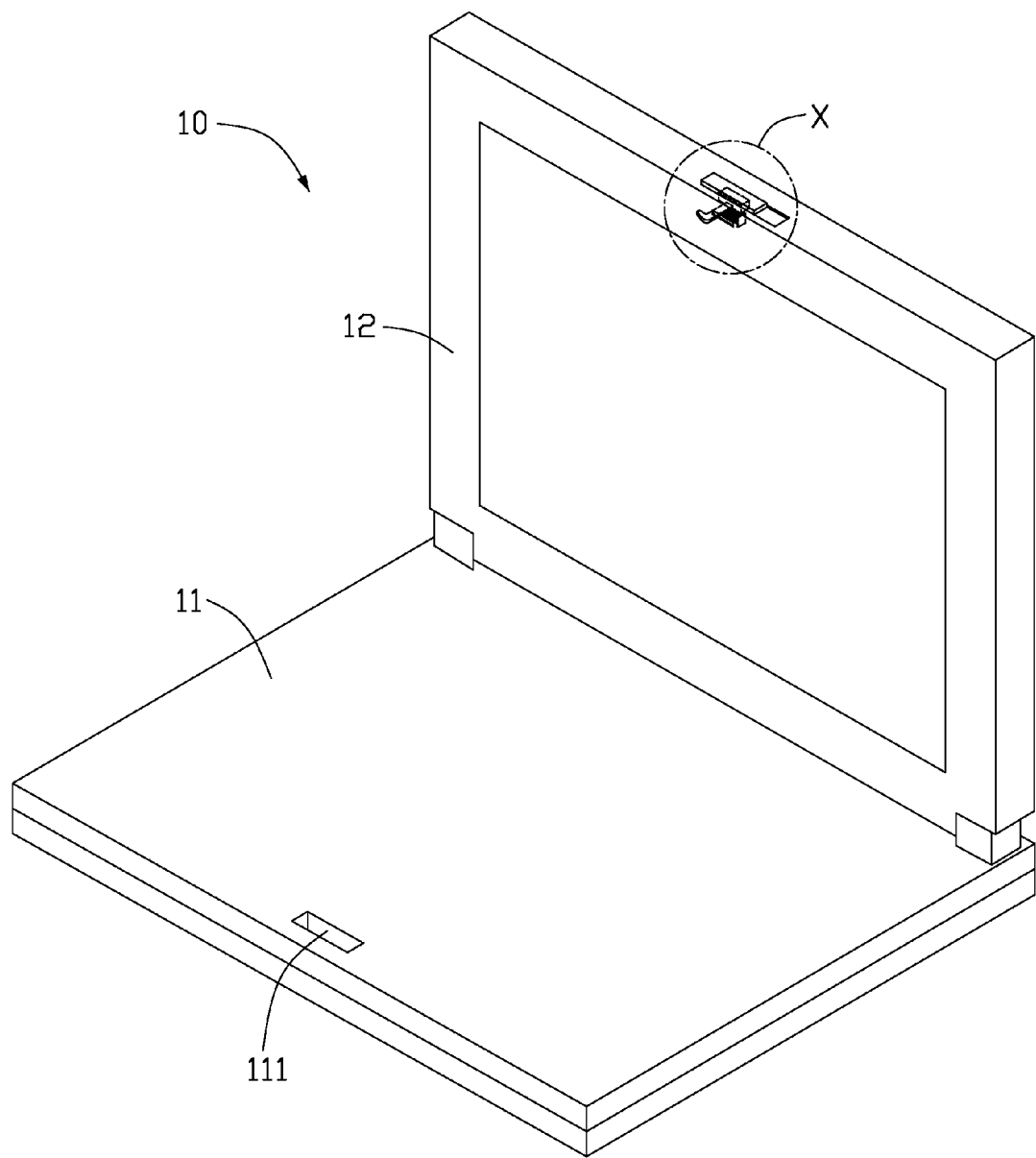
FIG. 9 is an isometric view of a conventional housing of a foldable electronic device.
Figure 10:
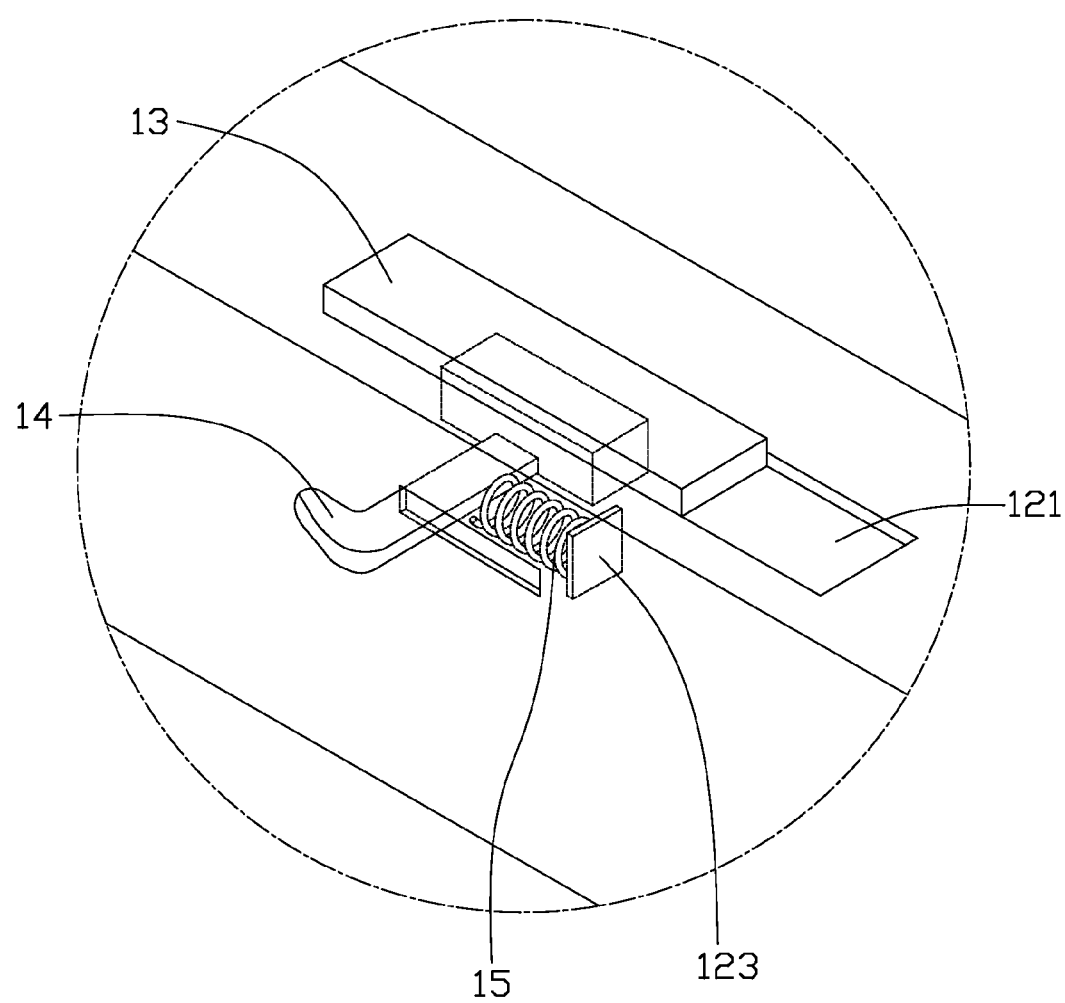
FIG. 10 is an enlarged view of the circled portion X in FIG. 9.

Referring to FIGS. 7 and 8, when the notebook is folded, the top cover 22 is folded atop of the main body 21 and the lock portion 247 is secured to the lock receiving portion 211.

To open the top cover 22, an external force is applied to the contact member 23 to slide the contact member 23, as a consequence the second transmission portion 235 pushes the first transmission portion 245. Then, the latching member 24 rotates relative to the pivot hole 241, thus driving the lock portion 247 outwards and unlatching the lock portion 211. The top cover 22 can now be flipped open. In addition, when the latching member 24 rotates, the resilient member 25 becomes deformed and accumulates potential energy, as soon as the pushing force on the contact member 23 is released, the latching member 24 is driven by the resilient member 25 to rotate back to its original position.

To fold up the notebook, another external force is manually applied on the top cover 22 and therefore pushes down the lock receiving portion 211 to engage with the lock portion 247, the folding up process completes with the lock portion 247 being latched to the lock receiving portion 211.

Furthermore, since the first transmission portion 245 is a protrusion and the second transmission portion 235 has a slanted surface, slope angle of the slanted surface will impact the effectiveness of opening the housing 20. The leverage ratio of the distance that the lock portion 247 moves to the distance that the contact member 23 slides can be increased by increasing the slope angle of the second transmission portion 235. At a high leverage ratio, the moving distance for the contact portion 231 can be relatively short, and the opening 2231 in FIG. 3 for receiving the contact portion 231 can be small, thus helping in designing small size notebooks.

In addition, since the moving distance for the contact portion 231 can be relatively short, a distance from a side of the contact portion 231 to a side of the opening 2231 can be small, thus aiding in designing large contact portion 231 with a large outer surface area in a small size notebooks. Therefore, a friction force between the finger and the contact portion 231 is increased and slippage between a finger and the contact portion 231 seldom happens, therefore the top cover 22 can easily be flipped open.

In the illustrated embodiment, the lock portion 247 and the lock receiving portion 211 are resilient hooks. It can be understood that, the lock portion 247 can be a resilient hook and the lock receiving portion 211 can be a notch.

In the illustrated embodiment, the resilient member 25 and the latching member 24 are separated. The resilient member 25 also can be formed integrally with the latching member 24.

The fixing portion 2233 may also be a separate member positioned on the top cover 22. If the contact portion 23 is partially exposed out of the top cover 22, the through hole 2231 can be omitted.

In the illustrated embodiment, the force receiving portion is a portion of the base 221. It can be understood that, the force receiving portion may also be replaced with a cylindrical protrusion or a groove.

In the above mentioned housing 20, supposing the top cover 22 is a first cover and the main body 21 is a second cover, the contact member 23, the latching member 24, and the resilient member 25 can be positioned on either the first cover or the second cover. It can be understood that, supposing the main body 21 is a first cover and the top cover 22 is a second cover, the contact member 23, the latching member 24, and the resilient member 25 can be positioned on either the first cover or the second cover.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A housing of a foldable electronic device, the housing comprising:
    a first cover including a lock receiving portion, a second cover including a fixing portion and a first sliding portion, a latching member including a lock portion configured for engaging with the lock receiving portion, a contact member including a contact portion and a second sliding portion, the contact portion being partially exposed out of the second cover, the second sliding portion engaging with the first sliding portion, and
    a resilient member;
    wherein the latching member includes a pivot hole and a first transmission portion, the pivot hole engages with the fixing portion such that the latching member is rotatable relative to the fixing portion, the contact member further includes a second transmission portion, the second transmission portion engages with the first transmission portion and is able to drive the latching member to rotate, the resilient member drives the latching member to rotate to its original position when the latching member is driven by the second transmission portion to rotate predetermined degrees; and
    wherein the latching member further includes a retaining portion, the second cover includes force receiving portion, the resilient member is a torsion spring, the spring coils of the resilient member is looped around the retaining portion with one end of the resilient member resisting the force receiving portion.

2. The housing of the foldable electronic device as claimed in claim 1, wherein the second cover defines a through hole, and the contact portion is positioned in the through hole.

3. The housing of the foldable electronic device as claimed in claim 1, wherein the second cover includes a base and a plurality of sidewalls extending from the base, and the through hole is defined in one of the sidewalls.

4. The housing of the foldable electronic device as claimed in claim 1, wherein the first sliding portion is an elongated groove defined in the second cover, and the second sliding portion is a protrusion.

5. The housing of the foldable electronic device as claimed in claim 4, wherein the second cover further includes a rib block adjacent to the through hole, and the elongated groove is defined in a side surface of rib block and opposite to the through hole.

6. The housing of the foldable electronic device as claimed in claim 5, wherein the second cover further includes two fixing blocks, the two fixing blocks are opposite to each other and two ends of the rib block are secured to the two the fixing blocks correspondingly.

7. The housing of the foldable electronic device as claimed in claim 1, wherein the contact member is elongated, the contact portion and the second sliding portion are located on opposite sides of the contact member correspondingly.

8. The housing of the foldable electronic device as claimed in claim 1, wherein the contact member is elongated, the first transmission portion is located one end of the contact member, the first transmission portion is a protrusion, and the second transmission portion has a slanted surface.

9. The housing of the foldable electronic device as claimed in claim 1, wherein the housing of the foldable electronic device further includes a pin, the fixing portion is a cylindrical groove, and the pin passes through the pivot hole and engages with the fixing portion.

10. A latching structure for a foldable electronic device, comprising:
   a lock receiving portion formed on a first cover of the foldable device;
   a fixing portion and a first sliding portion formed on a second cover of the foldable device;
   a latching member including a lock portion configured for engaging with the lock receiving portion, a contact member including a contact portion and a second sliding portion, the contact portion being partially exposed out of the second cover, the second sliding portion engaging with the first sliding portion, and
   a resilient member;
   wherein the latching member includes a pivot hole and a first transmission portion, the pivot hole engages with the fixing portion such that the latching member is rotatable relative to the fixing portion, the contact member further includes a second transmission portion, the second transmission portion engages with the first transmission portion and is able to drive the latching member to rotate, the resilient member drives the latching member to rotate to its original position when the latching member is driven by the second transmission portion to rotate predetermined degrees; and
   wherein the latching member further includes a retaining portion, the second cover includes force receiving portion, the resilient member is a torsion spring, the spring coils of the resilient member is looped around the retaining portion with one end of the resilient member resisting the force receiving portion.

11. The latching structure as claimed in claim 10, wherein the first sliding portion is an elongated groove defined in the second cover, and the second sliding portion is a protrusion.

12. The latching structure as claimed in claim 10, wherein the contact member is elongated, the contact portion and the second sliding portion are located on opposite sides of the contact member correspondingly.

13. The latching structure as claimed in claim 10, wherein the contact member is elongated, the first transmission portion is located one end of the contact member, the first transmission portion is a protrusion, and the second transmission portion has a slanted surface.

* * * * *